May 19, 1936.  S. S. SEYFERT  2,041,302

SYNCHRONOUS MECHANICAL RECTIFIER INVERTER AND ITS METHOD OF OPERATION

Filed Jan. 9, 1934  4 Sheets-Sheet 1

INVENTOR
Stanley S. Seyfert
BY
Prindle Bean + Mann
ATTORNEYS

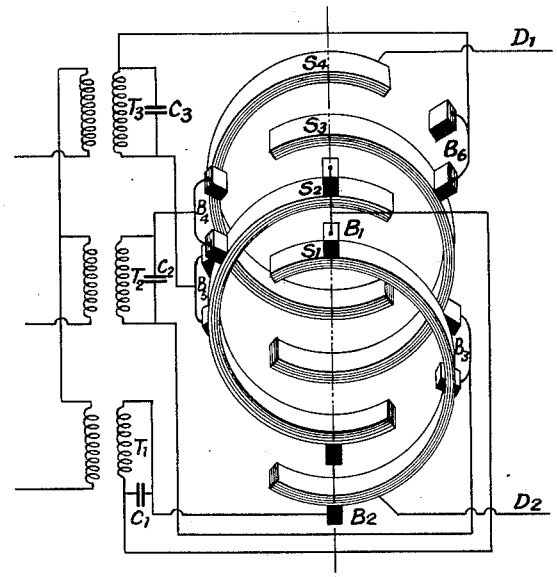
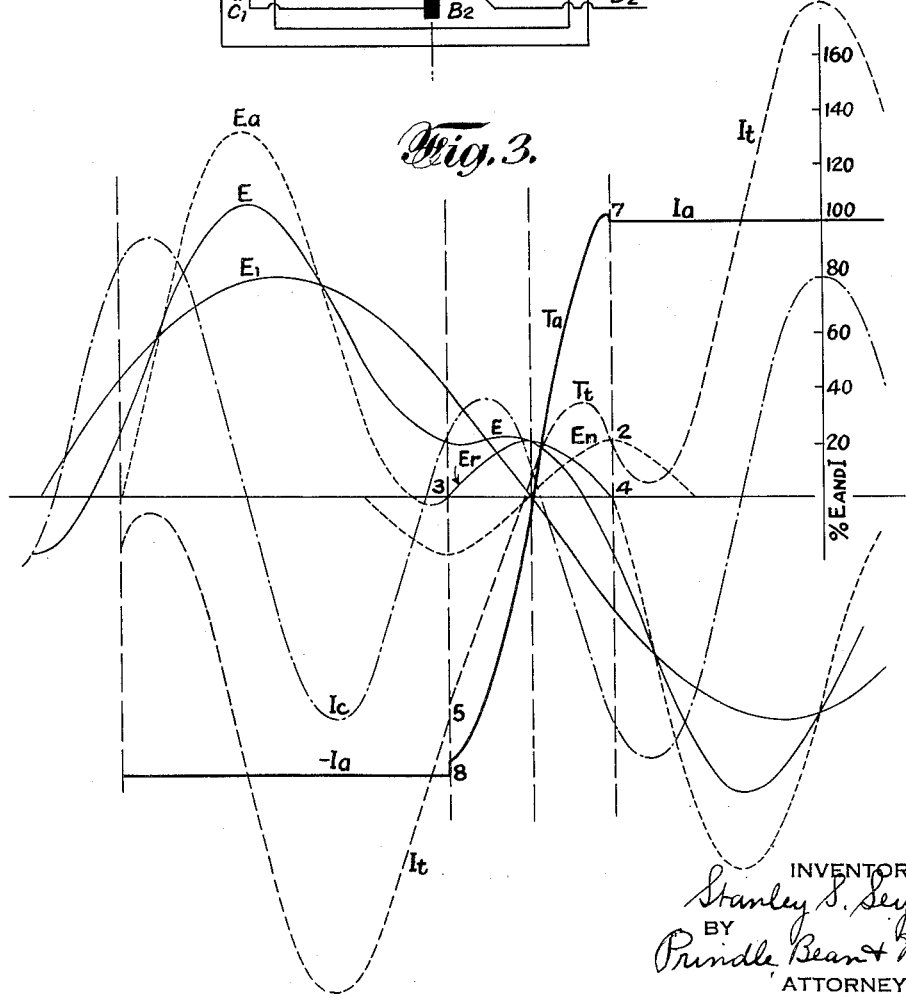

May 19, 1936.     S. S. SEYFERT     2,041,302
SYNCHRONOUS MECHANICAL RECTIFIER INVERTER AND ITS METHOD OF OPERATION
Filed Jan. 9, 1934     4 Sheets-Sheet 3

INVENTOR
Stanley S. Seyfert
BY
Prindle, Bean & Mann
ATTORNEYS

Patented May 19, 1936

2,041,302

UNITED STATES PATENT OFFICE 2,041,302

SYNCHRONOUS MECHANICAL RECTIFIER-INVERTER AND ITS METHOD OF OPERATION

Stanley S. Seyfert, Bethlehem, Pa., assignor to Lehigh University, a corporation of Pennsylvania Application January 9, 1934, Serial No. 705,862

29 Claims. (Cl. 175—364)

This invention provides an apparatus for converting alternating and direct current, the one into the other, and comprises certain novel methods and means by which the troublesome and destructive current and voltage conditions heretofore attending the operation of synchronous rectifiers have been minimized or removed.

In its completely developed form, this apparatus is useful for converting polyphase alternating current power into direct-current power or direct-current power into alternating-current power, the change of function occurring either automatically as determined by circuit conditions, or arbitrarily in response to the will of an operator. This change of function may occur within a few seconds of time and does not require any operative adjustments except those automatically provided by the apparatus itself.

To such ends, my invention consists in the method of and means for converting alternating and direct currents one into the other, hereinafter specified.

In the accompanying drawings:

Fig. 3 shows the voltages and currents occurring during the inverter operation.

Fig. 4 is a diagrammatic representation of a three phase rotor, with the phases in series.

My invention both as to its method and mechanical aspects, is capable of embodiment in many different forms, and while, in the accompanying drawings, I have illustrated my invention by the best embodiment known to me, such embodiments are to be taken as typical only of the many different forms which the invention can take, and my claims are not to be limited thereto.

Simple single-phase element

In order to secure a better understanding of the construction and operation of the complete polyphase apparatus, it is well to consider one of the single-phase elements composing the same.

Figure 1:
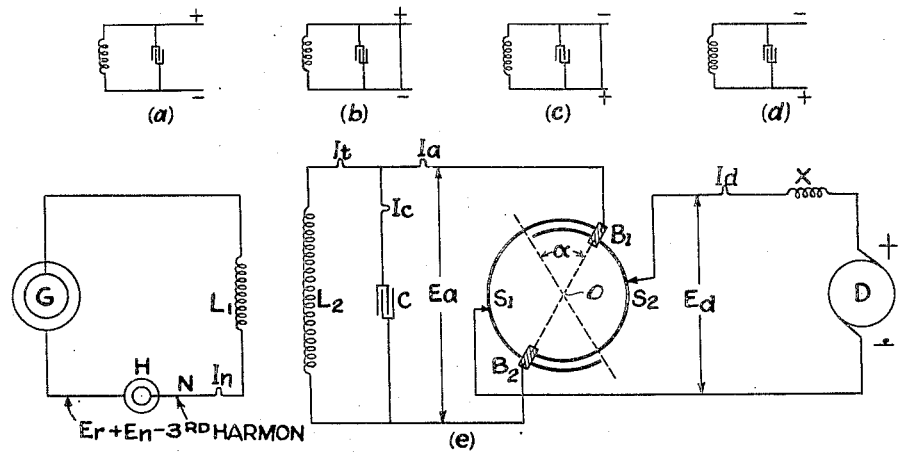
Fig. 1 shows diagrammatically a single element of my rectifier-inverter.

Fig. 1 shows the electrical connections of one of these elements. Two metallic conducting segments ($S_1$ and $S_2$) are mounted separately on two insulating discs which are mounted on the rotating shaft, the center of which is at O. These segments are removed from each other axially so as to be in separate planes; but in the figure they are shown as being in the same plane in order to explain their electrical action more clearly. The segments have an angular overlap ($\alpha$) on each side of a diameter.

Two brush sets ($B_1$ and $B_2$), each set consisting of two brushes, one brush sliding on $S_1$ and the other on $S_2$ and the two brushes of each set electrically connected together, are used to conduct current to and from the rotor. The two brushes of a set are mounted so as to be in line with each other axially and are supported by a rotatable brush holder such as is common with other electrical machines.

The terminals of the A. C. system are connected to the brushes ($B_1$ and $B_2$). The A. C. system is here represented by a transformer ($L_1L_2$), a generator (G), the source of A. C. power, and a harmonic generator (H) the purpose of which is described later. A condenser (C) is connected across the terminals of transformer coil ($L_2$) and thus between the brushes ($B_1$ and $B_2$).

The D. C. system is here represented by a D. C. generator or motor (D) whose terminals communicate electrically with the two segments ($S_1$ and $S_2$). This communication may be either by means of extra brushes sliding on the segment discs as indicated by the arrows or by means of two additional collector rings of the usual type communicating each with one of the segments. A reactance (X) connected in one of the D. C. lines serves to steady the flow of direct current in spite of the variable A. C. voltage and also serves to prevent a sudden and total short-circuit of the machine (D) during the part of the revolution when one of the brushes ($B_1$) connects $S_1$ and $S_2$ together. In the polyphase apparatus described later the use of reactance as a precaution against short-circuit is not necessary since, but one of of the phase elements is short-circuited at a time.

The coil (H) represents the armature of a harmonic generator driven by a synchronous motor (not shown) taking its power from the main generator (G). This machine introduces a frequency into the A. C. system 3, 5, or 7, etc., times as great as that of the fundamental frequency produced by G. The 3rd harmonic is used in this discussion; one component thereof is used to modify the A. C. wave form so as to produce low voltage periods when the brushes ($B_1$ and $B_2$) pass over the region of overlap of the segments. This component is termed the neutralizing voltage ($E_n$); its use is claimed in my application for Patent No. 583,833. Another component of the third harmonic of voltage, in quadrature with $E_n$ is used for the purpose of reversing the current in the A. C. system. This component will be termed $E_r$. As is shown later both voltages ($E_n$ and $E_r$) may be introduced by one and the same machine (H).

When currents and voltages are referred to in this description they may be considered as determined by measurements at the points of Fig. 1 as follows:

$I_t$ = transformer current (in coil $L_2$)
$I_a$ = alternating current to or from the rectifier-inverter
$I_c$ = condenser current
$I_d$ = direct current to or from rectifier-inverter
$I_n$ = alternating current in neutral (N) of polyphase system (when apparatus operates polyphase)
$E_a$ = A. C. voltage across brushes $B_1$ and $B_2$
$E_d$ = D. C. voltage across D. C. system terminals.

Connection sequence

Assuming rotation of the segment discs as indicated on Fig. 1 with brush $B_1$ resting clearly on segment $S_2$ and $B_2$ on $S_1$, the connections are: positive terminal of D through X to $S_2$ to $B_1$ to upper terminal of $L_2$, thence to $B_2$ to $S_1$ to negative terminal of D. This connection is indicated by (a) of Fig. 1.

When the brushes rest within the angle ($\alpha$), segments $S_1$ and $S_2$ are connected, which results in a short-circuit of the D. C. system. Also both brushes ($B_1$ and $B_2$) rest on one and the same segment ($S_1$ or $S_2$) thus producing a short-circuit of the A. C. system. This condition is represented by (b) and (c) of Fig. 1.

When the brushes slide clear of the angle ($\alpha$) the positive terminal of D will now communicate with the lower terminal of $L_2$, indicating a reversal of relative connections between the A. C. and the D. C. systems. This is indicated by (d) of Fig. 1. This reversal is similar to that produced by the ordinary 2-part commutator but differs from the latter in the introduction of the extended short-circuit period corresponding to the angle ($\alpha$). The periods when the brushes are clear of the angle ($\alpha$) are the working or power-transfer periods; those corresponding to $\alpha$ are the commutation or reversal periods.

Operation of element as rectifier

Assuming the single phase element whose connections are shown in Fig. 1; that the commutator is driven (in this case) by a two pole synchronous motor receiving its power from G, and that the harmonic generator, also synchronously driven, injects the 3rd harmonic of voltage into the A. C. system, the operation of rectification may be described by the use of Fig. 2. The short-circuit or commutation period (3—4) is equal in duration to a half cycle of the 3rd harmonic of voltage, this leaves the working period (6—7) equal to the length of two such half cycles. This relationship between length of commutation period and length of harmonic cycle is not absolutely necessary but advantageous.

The fundamental voltage supplied by generator (G) is shown as $E_1$ (assumed sinusoidal). One cycle of the 3rd harmonic neutralizing voltage is shown as $E_n$. One half cycle of the 3rd harmonic reversing voltage is shown as $E_r$. Both of these voltages are acting continuously; they are but partially represented on the figure to avoid confusion. The A. C. voltage as modified by the harmonics is shown as E.

The three voltage components ($E_1$, $E_n$, and $E_r$) each cause a leading current to flow into the condenser (C). The sum of the three condenser currents is $I_c$ and is one component of the current in the transformer coil ($L_2$). If the value of $$-L\frac{di_c}{dt}$$

where L is the A. C. system inductance and $$\frac{di_c}{dt}$$

is the rate of change of $I_c$ at any instant, is added to voltage (E), the result ($E_a$) will be the voltage across the terminals of the transformer ($L_2$), the condenser (C) and the rectifier brushes ($B_1$ and $B_2$). By a suitable choice of value of $E_n$, this voltage ($E_a$) can be made zero at points (3 and 4) as shown in Fig. 2.

Figure 2:
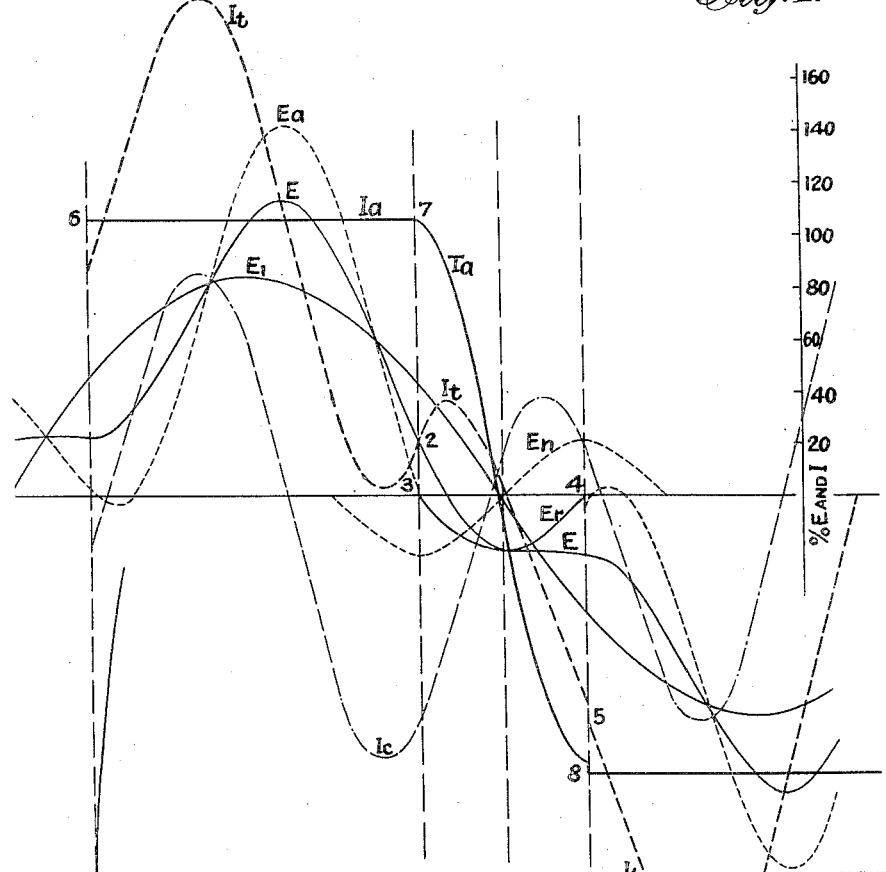
Fig. 2 shows the voltages and currents occurring during the rectifier operation.

With a high reactance at X (Fig. 1), the alternating current to the rectifier ($I_a$) can be maintained approximately constant from 6 to 7 (Fig. 2). The transformer current ($I_t$) however is the sum of $I_a$ and $I_c$ and is indicated by the heavy dashed curve.

When the commutation period begins (point 3 of Fig. 2) the current in the transformer, which is now short-circuited, is modified by the three voltages ($E_1$, $E_n$, and $E_r$) acting. $E_1$ and $E_n$ passing through zero at the neutral axis but $E_1$ being greater than $E_n$, causes an upward hump in $I_t$. $E_r$ causes a progressive decrease in $I_t$. The combined effect results in a current ($I_t$) during the period like 2–5 of the figure.

When an alternating voltage such as $E_1$ of Fig. 2 is impressed across the rectifier there is produced an effective D. C. voltage of $KE_1$ where K is a constant depending on conditions such as the actual wave form of $E_1$ and the portion of $E_1$ cut out by the commutation period (3—4). When the voltage of D. C. system ($E_d$) is equal to $KE_1$, no power is transferred. When $E_d$ is less than $KE_1$ power is passed into the D. C. system and the device is rectifying. The currents at the three points $I_t$, $I_a$, and $I_c$ of Fig. 1 are then represented by the curves similarly lettered in Fig. 2. A further increase of voltage ($E_1$) or a decrease of $E_d$ will increase the values of currents ($I_a$ and $I_t$).

It will be seen that the operation of this rectifier differs from those heretofore known to the art in that a harmonic voltage component ($E_n$) serves to reduce the voltage across the brushes to a very low value at the time commutation begins. This prevents the production of destructive sparking at the beginning and at the end of the commutation period and permits the use of much higher voltages than would otherwise be practicable.

Another difference in operation comes from the use of a second harmonic of voltage ($E_r$) so phased as to make one of its half cycles effective in reversing the current in the A. C. system. By making the strength of $E_r$ proportional to the load current, perfect reversals may be produced at any load.

Fig. 2 shows but one full working period (the positive) and the ensuing commutation period. A negative working period and another commutation period follow immediately thereafter.

Operation of element as an inverter

Assuming an element connected according to Fig. 1 and that the D. C. voltage ($E_d$) is now high enough to overpower the A. C. voltage i. e. $E_d$ is greater than $KE_1$, the current flow will be opposite to that just described for the case of rectification. Fig. 3 shows the same voltages and currents for this operation that have previously been shown by Fig. 2 for rectification. The corresponding currents and voltages of the two figures are lettered similarly. In this case the device is inverting, i. e. transforming power from D. C. to A. C. $I_a$ is negative when $E_1$ is positive.

The harmonic neutralizing voltage ($E_n$) is unchanged in phase because the fundamental voltage ($E_1$) is unchanged. The reversing voltage ($E_r$) is now acting in the opposite direction so as to serve to change the negative current ($I_a$) into an equal positive value. The reversal of $E_r$ is secured by exciting the field of the generator producing $E_r$ in series (either directly or indirectly) with the direct current delivered by the apparatus.

With the exception of certain reversals of values, some of which have been mentioned, Figs. 2 and 3 are somewhat similar. When this apparatus is caused to change abruptly from the function of rectifying to that of inverting by making a change, say, in the D. C. voltage, the curves of Fig. 2 as shown by a visual type oscillograph are gradually but continuously transformed to those of Fig. 3. It is believed that this is the first synchronous mechanical rectifier (excepting application No. 583,833) to demonstrate the reversibility of such a device under conditions of correct commutation and no sparking.

*Polyphase application*

In order to secure a steadier D. C. voltage at the terminals of such a rectifier-inverter and the better to adapt it to present-day A. C. power systems, it is desirable to combine 2, 3 or more phase elements in one machine. In this description the 3-phase application is used although this may well be extended to the use of 6, 12 or more phases. Each phase element functions in the manner already described and the several phases are arranged so that their voltages act in series. This results in a higher total D. C. voltage than would be obtained by the parallel arrangement of phases.

Fig. 4 shows the physical arrangement of the connection segments and brushes. The insulating discs, the shaft and other mechanical accessories have been omitted from the figure so as to leave it unconfused by parts the forms and the uses of which are well known. The figure also shows the essential electrical connections. Three transformers ($T_1$, $T_2$, and $T_3$) have their primaries connected in star. The neutral connection (N) is used as explained later for the introduction of the harmonic voltages (see Fig. 5). The transformer secondaries each have a condenser connected across their terminals which terminals lead to diametrically opposite double brush sets. Taking, for example, the transformer coil ($T_1$) with its condenser ($C_1$), the two terminals of $T_1$ lead to brushes ($B_1$ and $B_2$) respectively. These brushes ride on segments ($S_1$ and $S_2$) after the fashion of Fig. 1. The parts just described constitute one phase (A) element of the rectifier whose action is quite similar to that of Fig. 1.

Transformer $T_2$ connects to brushes ($B_3$ and $B_4$) riding on segments ($S_2$ and $S_3$). This constitutes the (B) phase element. Finally, transformer $T_3$ connecting to brushes ($B_5$ and $B_6$) riding on segments ($S_3$ and $S_4$) constitutes the (C) phase element.

It will be seen that segments ($S_2$) functions in both the A and B phase elements and serves to conduct the current from transformer $T_1$ over through transformer $T_2$ at such times when this is desired. The terminal segments ($S_1$ and $S_4$) are kept in continuous contact with the D. C. lines ($D_2$ and $D_1$). The segments are made to have an overlap equal to the angle ($\alpha$) of Fig. 1. The 3 pairs of brush sets are displaced circumferentially by 120 electrical degrees one ahead of or behind the other so that the currents of the 3 transformers will undergo reversal in the same order followed by the respective A. C. voltages acting in them. The holders for the brushes are not shown in the figure and may be such as have been used with other types of rectifiers or electrical machines.

Tracing the circuit for the rotor position shown in Fig. 4 and starting with D. C. line $D_1$ there are in succession segment $S_4$, brush $B_5$ upward through transformer $T_3$, brush $B_6$; segment $S_3$, brush $B_3$ upward through transformer $T_2$, brush $B_4$; segment $S_2$, brush $B_1$ upward through transformer $T_1$, brush $B_2$; to D. C. line $D_2$. Thus the 3 transformer coils are all oriented in the same general direction as to the D. C. circuit. It will be seen, however, that the connection of $S_1$ to $S_2$ by brush $B_1$ results in shunting the direct current out of transformer $T_1$ for the time chosen; also the fact that both brushes $B_1$ and $B_2$ rest on the same segment $S_1$ indicates a short-circuit of the A. C. phase from which transformer $T_1$ operates. In other words, the current of $T_1$ is undergoing commutation after the manner described in connection with the single phase element. Each of the A. C. phases is commutated in its proper turn.

The D. C. lines $D_1$ and $D_2$ are continuously connected to segments $S_4$ and $S_1$ by pairs of extra brushes sliding thereon but not shown in Fig. 4.

*Complete equipment*

Figure 5:
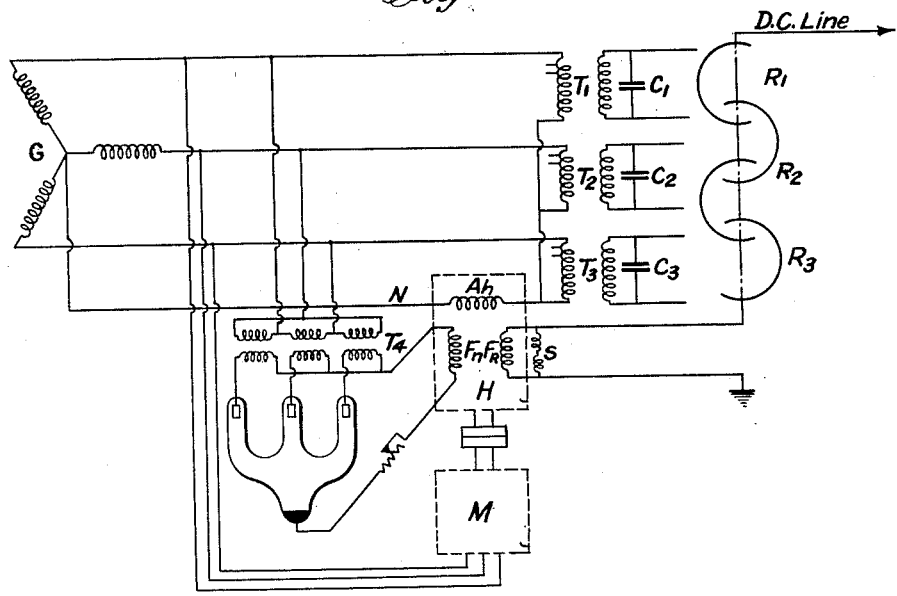
Fig. 5 is a diagrammatic representation of a complete rectifier-inverter system embodying my invention.
Figure 6:
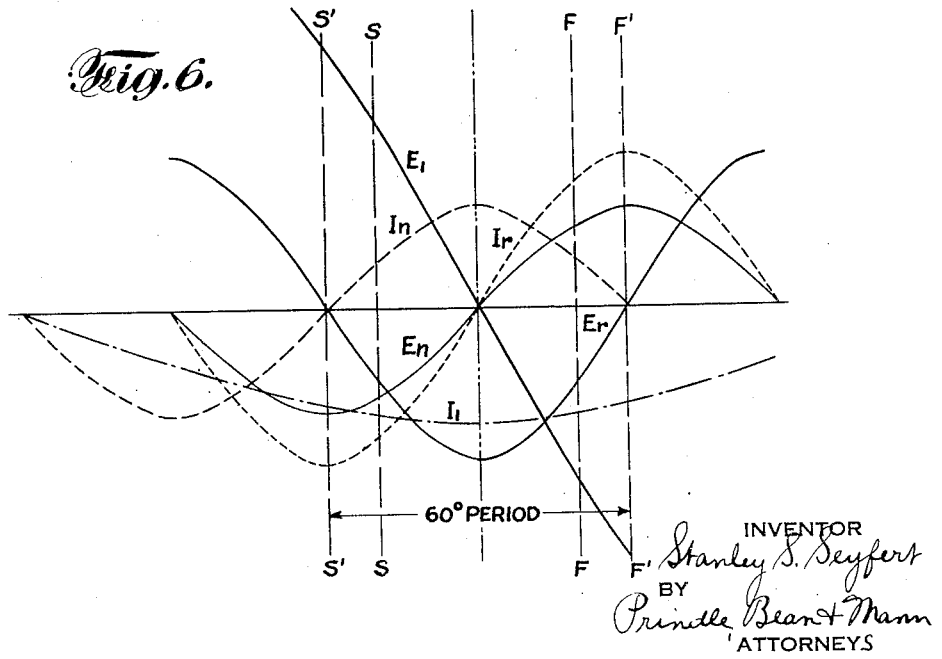
Fig. 6 shows the phase relations of harmonic voltages and currents.
Figure 7:
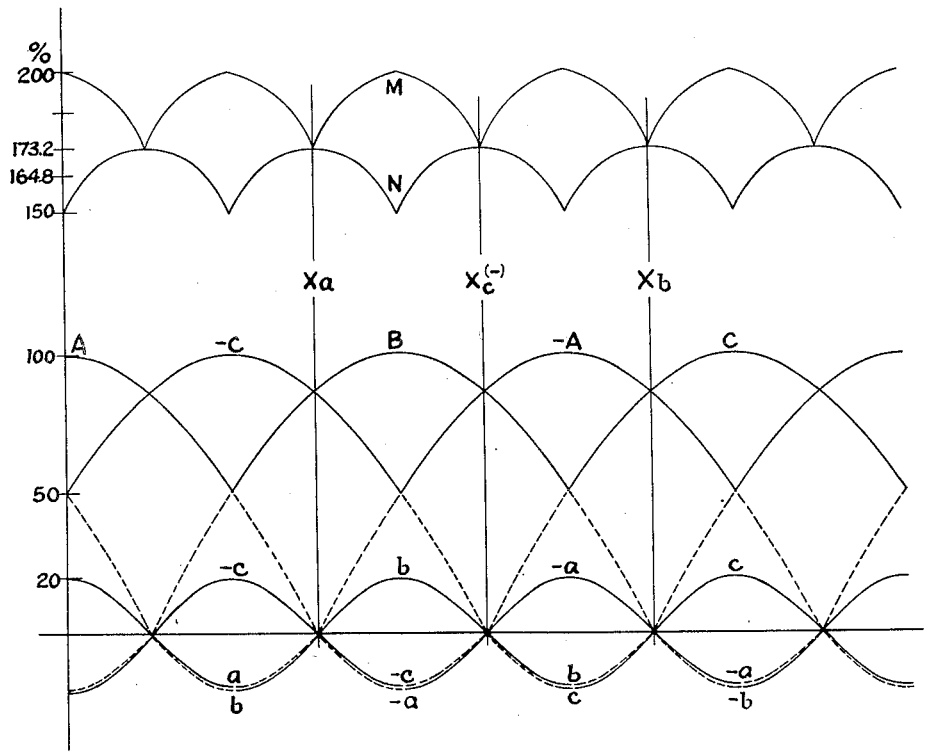
Fig. 7 shows the direct-current voltage forms.

The essentials of a complete equipment for 3-phase A. C. to D. C. rectification or inversion are indicated in Fig. 5 where G is the source of fundamental A. C. polyphase voltage, in other words the A. C. power system. $T_1$, $T_2$, and $T_3$ are transformers with their primaries connected in star and their secondaries connected to the brushes of the rectifier elements as in Fig. 4. The transformer primaries are provided each with taps for the purpose of securing a change in ratio. The neutral wire from the transformer connection (N) leads through the armature $A_h$ of the generator (H) supplying the harmonic voltages ($E_n$ and $E_r$).

The harmonic generator has a single armature winding $A_h$ but two field windings. $F_r$ connected in series with the direct current output (or input) supplies a field proportional to the load and reversing with a reversal of direct current. This field generates the component $E_r$ used for reversing the alternating currents. The shunt S across this field allows for an adjustment of its strength for a given current.

The field $F_n$ is placed in electrical quadrature with $F_r$ so as to produce a harmonic voltage ($E_n$) displaced by 90 electrical degrees from $E_r$. The voltage $E_n$ is used for the purpose of voltage neutralization as previously described. Since $E_n$ should be at all times proportional to the A. C. system voltage, the field $F_n$ is shown as excited in shunt from the A. C. system through a suitable rectifier.

From the well known phase relations of 3rd harmonics in the 3 phases of a star connected A. C. system, it is seen that a given 3rd harmonic component of voltage such as $E_n$ introduced into the neutral N by the armature $A_h$ becomes similarly and equally effective in modifying each of the 3-phase voltages. In like manner, a voltage such as $E_r$ becomes equally effective in producing current reversal in each of the separate phase elements of the rectifier.

The synchronous motor M driving the harmonic generator H receives its power from the A. C. system so as to maintain a correct relationship between the fundamental A. C. voltages and the harmonics. The rectifier $R_1$, $R_2$, and $R_3$ may be driven by the same synchronous motor M or by another motor, also synchronous. During the operation of the apparatus as a rectifier the motor M is called on to convert a limited amount of mechanical power into electrical power and conversely when the apparatus is inverting, M must convert electrical power into mechanical power. The gross power transformation, in either case, amounts to only a few per cent of the power handled by the rectifier-inverter.

There is no fixed value that must be assigned to the capacitances of the condensers $C_1$, $C_2$, and $C_3$. The larger these capacitances are the smaller may be the value of $E_r$ to cause complete reversal of the current. In Fig. 2, the transformer current $I_t$ approaches the commutation period with a value 3—2. The duty of $E_r$ is to change this value 3—2 to 4—5. Since the form of $I_t$ results from the addition of $I_c$ to $I_a$, a reduction of capacitances which reduces $I_c$ will result in a higher point 2 and a lower point 5 thus requiring a larger value of $E_r$. For low values of A. C. system reactance, it becomes feasible to operate with zero capacitances. The equation for $E_r$ is given by $$E_r = \frac{I_a}{\frac{1}{w_3 L} + \frac{1}{w_3 L - \frac{1}{w_3 C}}}$$

where $I_a$ = value of direct current flowing
$w_3 = 2\pi f_3$, where $f_3$ is the 3rd harmonic frequency
L = the inductance of one phase of the A. C. system derived from the leakage reactance of one transformer plus the transient reactances of $A_h$ plus the balance of the system reactance including one phase of the generating machine G.
C = capacitance of one condenser.

*Operation as inverter without generator G*

If the motor M of Fig. 5 driving the harmonic generator H and the rectifier proper is arranged to be supplied by an uninterrupted supply of power, the A. C. generator G may be entirely disconnected while direct current voltage is impressed across the D. C. terminals. The apparatus now generates balanced 3-phase voltages and is able to deliver either true power, reactive power or both to a 3-phase load connected to the three lines leading from the transformers. This operation constitutes simple inversion without the assistance of excitation from the A. C. system. The frequency of the alternating current voltages, in this case, depends on the speed with which the commutator is driven.

Although the principle of action of this rectifier-inverter has been explained on the basis of a single-phase element and its polyphase application confined in the description to the well known 3-phase system, it is pointed out that the principles employed are equally applicable to a 6 a 12 or an $n$-phase system. The greater the number of phases the greater will be the inherent steadiness of the D. C. voltage and current. When the number of phases is very large the direct current approaches the ideal steady value assumed in the foregoing discussion. This constant value of direct current however imposes the maximum duty on the commutating or reversing means employed. The odd harmonic of voltage here used for producing reversal has been found entirely sufficient and satisfactory.

When two complete outfits such as illustrated by Fig. 5 are placed, one at each end of a D. C. transmission line, they will make possible the interconnection of two separate A. C. power systems (A and B). Power may flow either from A to B or from B to A. The two systems need not operate at the same frequency but the driving motors $M_a$ and $M_b$ are in step with the frequency of systems A and B respectively. Two of these rectifier-inverter outfits therefore constitute a system for changing frequency free of the usual limitations of frequency-changer sets now in use. Two of these limitations are the restricted combinations as to number of poles and the necessity of stator shift to effect power transfer.

The foregoing description has been made with the object of showing one ordinarily skilled in the art how to construct and operate this rectifier-inverter. Additional matters of interest to the designer may be found in a paper delivered by the author before the American Institute of Electrical Engineers on January 25, 1933. Further information may be obtained from a thesis by the author entitled "Direct-Current Power Transmission through Rectification and Inversion" in the library of the Massachusetts Institute of Technology.

What I claim is:

1. In a device for transforming alternating and direct current power, the one into the other, the combination with means for reversing the relative connections between the A. C. and D. C. systems, of means for superposing an odd harmonic of voltage upon the fundamental A. C. supply voltage said odd harmonic of voltage being so phased as to reverse the A. C. system current.

2. In a device for transforming alternating and direct current power, the one into the other, the combination with means for reversing the relative connections between the A. C. and D. C. systems of means for superposing an odd harmonic of voltage upon the fundamental A. C. supply voltage said odd harmonic of voltage consisting of two components not in phase with each other, one of said components assisting in the reversal of the A. C. system current and the other component producing low A. C. voltage during the period of said reversal.

3. In a device for transforming alternating and direct current power, the one into the other, the combination with means for reversing the relative connections between the A. C. and D. C. systems, of means for superposing an odd harmonic of voltage upon the fundamental A. C. supply voltage, said odd harmonic of voltage consisting of two components not in phase with each other, one of said components assisting in the reversal of the A. C. system current and the other component producing low A. C. voltage during the period of said reversal, with means for independently regulating the strengths of said voltage components.

4. In a device for transforming alternating and direct current power, the one into the other, the combination with means for reversing the relative connections between the A. C. and D. C. systems, of means for superposing an odd harmonic of voltage upon the fundamental A. C. supply voltage, said odd harmonic of voltage consisting of two components not in phase with each other one of said components assisting in the reversal of the A. C. system current and the other component producing low A. C. voltage during the period of said reversal, with means for holding the current reversing component proportional to the load passing through the device and means for holding the other component proportional to the A. C. system voltage.

5. In a device for transforming alternating and direct current power, the one into the other, the combination with means for reversing the relative connections between the A. C. and D. C. systems, of means for superposing an odd harmonic of voltage upon the fundamental A. C. supply voltage said odd harmonic of voltage consisting of two components not in phase with each other one of said components assisting in the reversal of the A. C. system current and the other component producing low A. C. voltage during the period of said reversal said means consisting of the armature of a harmonic generator acted upon by two fields in electrical quadrature with each other.

6. In a device for transforming alternating and direct current, the one into the other, the combination of A. C. and D. C. systems with means for reversing the relative connections between the A. C. and D. C. systems, of means for superposing an odd harmonic of voltage upon the fundamental A. C. supply voltage, said odd harmonic of voltage consisting of two components not in phase with each other, one of said components assisting in the reversal of the A. C. system current, and the other component producing low A. C. voltage during the period of said reversal, said means consisting of the armature of a harmonic generator acted upon by two fields in electrical quadrature with each other said two fields being regulable independently of each other.

7. In a synchronous-mechanical device for transforming alternating and direct current, the one into the other, the combination of means for superposing an odd harmonic of voltage upon the fundamental of voltage of the A. C. system with means for creating short-circuiting periods for that system approximately equal in duration to the time of a half cycle of said odd harmonic of voltage.

8. In a synchronous-mechanical device for transforming alternating and direct current, the one into the other, the combination with an A. C. and a D. C. system connected by the device of essentially two-part connecting elements comprising conducting segments rotated by the same shaft but placed in different planes, the angular reach of said segments being such as to produce an angular overlap of one segment with respect to the other, and double brush sets connecting with the terminals of the A. C. system and causing short-circuits thereof twice during each cycle of the A. C. system voltage.

9. The method of transforming alternating and direct currents, the one into the other, comprising effecting reversal of the current of the alternating current system by so superposing an odd harmonic of voltage upon the fundamental of supply voltage as to reduce said supply voltage and cause said reversal.

10. The method of transforming alternating and direct currents, the one into the other, comprising effecting the reversal of the current in the alternating current system by superposing an odd harmonic of voltage upon the fundamental of supply voltage and holding the value of said harmonic of voltage approximately proportional to said current in said system.

11. The method of transforming alternating and direct currents, the one into the other, comprising effecting the reversal of the current in the alternating current system by superposing an odd harmonic of voltage acting toward reversal upon the fundamental of voltage and at the same time securing low alternating current voltage during the period of such reversal by superposing a second odd harmonic of voltage differing in phase from the voltage of said first harmonic upon the fundamental.

12. The method of transforming alternating and direct currents, the one into the other, comprising effecting the reversal of the current in the alternating current system by superposing an odd harmonic of voltage acting toward reversal upon the foundamental voltage, and securing low alternating current voltage during the period of such reversal by superposing a second odd harmonic of voltage differing in phase from the voltage of the first harmonic upon the fundamental and holding said first harmonic of voltage approximately proportional to the current transformed by the device and holding said second harmonic of voltage approximately proportional to the fundamental alternating current system voltage.

13. The method of transforming alternating and direct currents, the one into the other, comprising effecting the reversal of the current in the alternating current system by superposing an odd harmonic of voltage on the alternating current supply voltage, which harmonic contains two components differing in phase, and separately adjusting each component to the load conditions under which the system is working.

14. The method of transforming alternating and direct currents, the one into the other, comprising effecting the reversal of the current in the alternating current system by superposing an odd harmonic of voltage on the alternating current supply voltage, which harmonic contains two components differing in phase, and so phasing one component as to cause reversal of the current in the alternating current system, and so phasing the other component as to cause low alternating current voltage during the period when such reversal takes place.

15. The method of transforming alternating and direct currents, the one into the other, comprising producing two odd harmonic components of voltage in the alternating current system, and regulating them independently of each other by causing two independently regulable prime sources of voltage to act upon a single element of the alternating current system.

16. The method of transforming alternating and direct currents, the one into the other, comprising reducing the current of the alternating current system at the beginning of a commutation period by superposing leading currents caused by an odd harmonic of voltage in the alternating current system upon the current wave form otherwise obtaining in the said system.

17. The method of transforming alternating and direct currents, the one into the other, without producing sparking, comprising short-circuiting both the alternating current and direct current systems, and during such period of short circuit so applying an odd harmonic of voltage acting in the alternating current system as to effect a reversal of the said alternating current.

18. The method of transforming alternating and direct currents, the one into the other, comprising introducing an odd harmonic of voltage in the alternating current system and causing said odd harmonic of voltage to reverse with a reversal of direction of the power flow, and maintaining it substantially proportional to the strength of said power flow for either direction thereof.

19. The method of transforming alternating and direct currents, the one into the other, comprising introducing an odd harmonic of voltage in the alternating current system and causing said odd harmonic of voltage to reverse automatically with a reversal of direction of the power flow, and maintaining it substantially proportional to the strength of said power flow for either direction thereof.

20. The method of transforming poly-phase alternating and direct current power, the one into the other, comprising effecting commutation of the current of each of the alternating current system phases by superposing an odd harmonic of voltage upon the fundamental of voltage in each phase of the said alternating current system.

21. The method of transforming alternating and direct currents power, the one into the other, comprising effecting a reduction of the alternating current system current required to be reversed, and at the same time effecting such reversal by superposing an odd harmonic of voltage upon the fundamental alternating current voltage.

22. The method of transforming alternating and direct currents power, the one into the other, comprising effecting a reduction of the alternating current system current required to be reversed, and at the same time effecting such reversal by superposing an odd harmonic of voltage upon the fundamental alternating current voltage, and so phasing the same as to give said voltage harmonic current-reversing power, and superposing odd harmonic currents to give current-reducing power, said odd harmonic currents being superposed upon other currents flowing in the circuit of the alternating current system.

23. In a device for transforming polyphase-alternating and direct currents, the one into the other, the combination with means for reversing the relative connections between the A. C. and D. C. systems, of a polyphase commutator, and means for introducing one and the same odd harmonic of voltage into each phase of the A. C. system, said odd harmonic being so phased or timed in each of the A. C. system phases as to reverse the current in each of such phases.

24. In a device for transforming polyphase-alternating and direct currents, the one into the other, the combination with means for reversing the relative connections between the A. C. and D. C. systems, of a polyphase commutator, and means for introducing one and the same 3rd harmonic of voltage into each phase of the A. C. system, said third harmonic being so phased or timed in each of the A. C. system phases as to reverse the current in such phases.

25. In a device for transforming polyphase-alternating and direct currents, the one into the other, the combination, with means for reversing the relative convections between the A. C and D. C. systems, of a three-phase commutator, and means for so introducing one and the same third harmonic of voltage into each phase of the A. C. system that said harmonic shall be so timed in each of the A. C. system phases as to reverse the current in such phases, said means for introducing said harmonic into each phase consisting of a coil of a single third harmonic generator connected into the neutral line of the three-phase system.

26. In a synchronous mechanical device for transforming alternating and direct currents, the one into the other, the combination of a polyphase A. C. system, and a D. C. system, connected by single-phase commutating elements, one for each phase, each element consisting essentially of a two-part commutator, the parts thereof rotating in different planes but so disposed that a certain part of the element belonging to one A. C. phase becomes a similarly functioning part in the element of another phase.

27. In a synchronous-mechanical device for transforming alternating and direct currents, the one into the other, the combination of a polyphase A. C. system, and a D. C. system connected by single-phase commutating elements, one for each phase of the A. C. system, each element including two switching segments rotating in different planes, the segments of the different elements being so disposed that a given segment functions similarly successively in two of the phase elements 28. The method of transforming alternating and direct currents, the one into the other, comprising reducing the current of the alternating current system at the beginning of a commutation period by generating a non-sinusoidal alternating current wave and absorbing into a capacitance an odd harmonic of current contained in said wave.

29. The method of transforming polyphase-alternating and direct currents power, the one into the other, which comprises producing short circuits of the phases of the alternating current system and thereby effecting an electrical isolation of the alternating current phase from the direct current system, and reversing the current in each of the said alternating current system phases in turn by imposing an odd harmonic of voltage on each of the said phases.

STANLEY S. SEYFERT.